United States Patent [19]
Sunaga et al.

[11] Patent Number: 5,729,989
[45] Date of Patent: Mar. 24, 1998

[54] ELECTRONIC CLIMATE CONTROL SYSTEM FOR AUTOMOTIVE VEHICLES

[75] Inventors: Hideki Sunaga, Azuma; Masatoshi Suto, Sano, both of Japan

[73] Assignee: Calsonic Corporation, Tokyo, Japan

[21] Appl. No.: 741,511

[22] Filed: Oct. 31, 1996

[51] Int. Cl.⁶ ..................................... F25B 49/02
[52] U.S. Cl. ............................. 62/126; 62/163; 62/244; 165/204
[58] Field of Search ............................ 62/126, 128, 129, 62/130, 176.2, 176.6, 173, 161, 163, 244; 165/203, 204; 236/44 R, 44 A, 44 C, 49.3

[56] References Cited

U.S. PATENT DOCUMENTS

| | | | |
|---|---|---|---|
| 4,381,549 | 4/1983 | Stamp, Jr. et al. | 62/126 |
| 4,448,034 | 5/1984 | Shimada et al. | 62/161 |
| 4,910,967 | 3/1990 | Takahashi | 62/163 X |
| 4,951,476 | 8/1990 | Yamamoto et al. | 62/163 |
| 5,156,204 | 10/1992 | Doi | 165/204 |

*Primary Examiner*—Harry B. Tanner
*Attorney, Agent, or Firm*—Foley & Lardner

[57] ABSTRACT

An electronic climate control system for a car air conditioner comprises sensors for detecting an ambient temperature, an in-car temperature and a heat load, a climate control unit responsive to signals from the sensors for adjusting an interior environment within the vehicle passenger compartment towards desired in-car temperature and humidity conditions, a manual-input panel for manually setting a system's operating mode, and a communications line between the climate control unit and the manual-input panel. The climate control system has a fail-safe function for automatically selecting an automatic air-conditioning mode and/or a fresh-air mode as the system's operating mode necessary to prevent any moist air from fogging the windshield in the presence of a failure in communication between the control panel and the control unit.

7 Claims, 4 Drawing Sheets

ELECTRONIC CLIMATE CONTROL SYSTEM FOR AUTOMOTIVE VEHICLES

BACKGROUND OF THE INVENTION

1. Field of the Invention

The present invention relates to an electronic climate control system suitable for use in automotive vehicles, and particularly to an electronic climate control system having a fail-safe function that prevents any moist air such as breath humidity from the driver and passengers from clouding or fogging the windshield, even when there is no communication between a climate control panel and a climate control unit employed in the climate control system.

2. Description of the Prior Art

In recent years, there have been proposed and developed various automated electronic climate control systems that control the heating, ventilation, and air conditioning systems within the passenger compartment. A typical modern automated electronic climate control system could provide an auto mode at which an in-car temperature is automatically adjusted towards the desired, set in-car temperature selected by the driver or passenger by rotating a temperature selector switch or temperature control dial on the vehicle instrument panel, in consideration of input information such as an actual in-car temperature from an in-car temperature sensor, an ambient temperature from an outside temperature sensor, a heat load radiating into the vehicle passenger compartment and monitored by a sunload sensor, and the like. As is generally known, the flow rate of discharged air (conditioned air) as well as the in-car temperature is automatically controlled in the auto mode. In addition, in the auto mode, the climate control system would function to avoid condensation or freezing of moisture on the windshield, monitoring/sampling an in-car humidity as well as a variety of temperatures. In later model car air conditioners, a so-called auto mode button is usually provided for changing from the auto mode to a manual mode or vice versa alternately by depressing the auto mode button often called AUTO switch, so as to ensure a manually selected, desired air-conditioning control in addition to automatic temperature regulation, automatic discharge mode selection and automatic blower-fan speed control based on the automatic air-conditioning control (the auto mode). For this purpose, a typical climate control system includes a control panel with various buttons/dials for in-car temperature manual-setting as well as discharge-mode manual-setting. The control unit of the climate control system ordinarily comprises an evaluation network/amplifier, often called "auto amplifier". During the manual mode, in the evaluation network/amplifier, manually-selected signals from the control panel are added to a variety of signals from system sensors such as an in-car temperature sensor, an ambient air temperature sensor, and a sunload sensor. The evaluation network/amplifier typically accommodates therein a microcomputer for processing the previously-noted signals and for driving or activating various actuators for example an intake door actuator, an air mix door actuator, a shift actuator often called "mode door actuator" and a fan control amplifier. As is well known, for information transmission or signal transmission, the evaluation network/ amplifier is intercommunicated with the control panel by way of a multiplex communication system. In the event that the communication between the evaluation network/ amplifier and the control panel has been ceased accidentally due to breakage of communication lines or loose connections between the communication lines or imperfect contact of switches installed on the control panel, the prior art climate control system usually functions to continue the system's operating mode executed just before the communication between the so-called auto amplifier and the control panel has been ceased accidentally. Necessarily, the system's operating mode, continuously executed while the vehicle experiences such a trouble for example breakage of communication lines, is not always suitable to all surrounding conditions. For instance, when the communication between the auto amplifier and the control panel becomes ceased unintendedly under a condition wherein heating is desired in cold weather and then the climate control system is turned on in the heating mode as well as a recirculation mode abbreviated to "REC mode" the current system's operating mode may be continually executed for a while with the compressor turned OFF and with the air inlet recirculation door closed. Owing to such a communication failure, there is a possibility that the windshield is fogged by moist air such as breath humidity from the driver or passengers depending upon surrounding conditions for example in rainy weather. To avoid condensation or freezing of moisture on the windshield, usually, the driver will intend to select a DEFROST mode or a DEFOG mode. However, in the presence of the previously-noted communication failure, a mode-selection switch signal indicative of the DEFROST mode or the DEFOG mode cannot be transmitted from the control panel via the communication line to the auto amplifier and thus the current system's operating mode remains unchanged.

SUMMARY OF THE INVENTION

Accordingly, it is an object of the invention to provide an improved electronic climate control system for an air conditioner which avoids the foregoing disadvantages of the prior art.

It is another object of the invention to provide an electronic climate control system for an automotive vehicle having a fail-safe function by way of which the system can deliver or direct a comfortable, conditioned air to a desired discharge outlet even in presence of communication failure between an evaluation network/amplifier and a climate control panel.

In order to accomplish the aforementioned and other objects of the invention, an electronic climate control system for a car air conditioner comprises sensor means for detecting environmental conditions including at least an ambient temperature, an in-car temperature and a heat load radiating into a vehicle passenger compartment, control means being responsive to signals from the sensor means for adjusting an in-car temperature condition towards a desired in-car temperature, manual input means for manually setting a system's operating mode, communication means for inter-communicating the control means with the manual input means, communication-line detection means for determining whether a mutual-communication between the control means and the manual input means is made normally, and defogger means for automatically determining the system's operating mode necessary to prevent a windshield from being fogged when the communication-line detection means determines that a failure in mutual communication is present.

According to another aspect of the invention, an electronic climate control system for a car air conditioner comprises sensors for detecting environmental conditions including at least an ambient temperature, an in-car temperature and a heat load radiating into a vehicle passenger compartment, a climate control unit being responsive to signals from the sensors for adjusting an interior environment within the vehicle passenger compartment towards desired in-car temperature and humidity conditions, a manual-input panel for manually setting a system's operating mode, a communications line for intercommunicating the climate control unit with the manual-input panel, communication-line detection means for determining whether a failure in data transmission from the manual-input panel to the climate control unit is present, the communication-line detection means determining that the failure in data transmission is present when the failure in data transmission continues for a predetermined period of time from an initial detection time of the failure in data transmission, and fail-safe means for automatically determining the system's operating mode necessary to prevent a windshield from being fogged when the communication-line detection means determines that the failure in data transmission is present. The fail-safe means may preferably comprise means for automatically shifting the system's operating mode to an automatic air-conditioning mode and for simultaneously setting an air inlet mode at a fresh-air mode, when the communication-line detection means determines that the failure in data transmission is present. Preferably, the fail-safe means may comprise means for fixing an in-car temperature setting to a predetermined temperature value when the communication-line detection means determines that the failure in data transmission is present. Alternatively, the fail-safe means may comprise operating-state decision means for determining whether an air-conditioning compressor is in an on state and for determining whether the car air conditioner is in an on state, and means for automatically setting an air inlet mode at a fresh-air mode, when the communication-dine detection means determines that the failure in data transmission is present and the operating-state decision means determines that one of the air-conditioning compressor and the car air conditioner is in an off state.

DESCRIPTION OF THE PREFERRED EMBODIMENT

Figure 1:
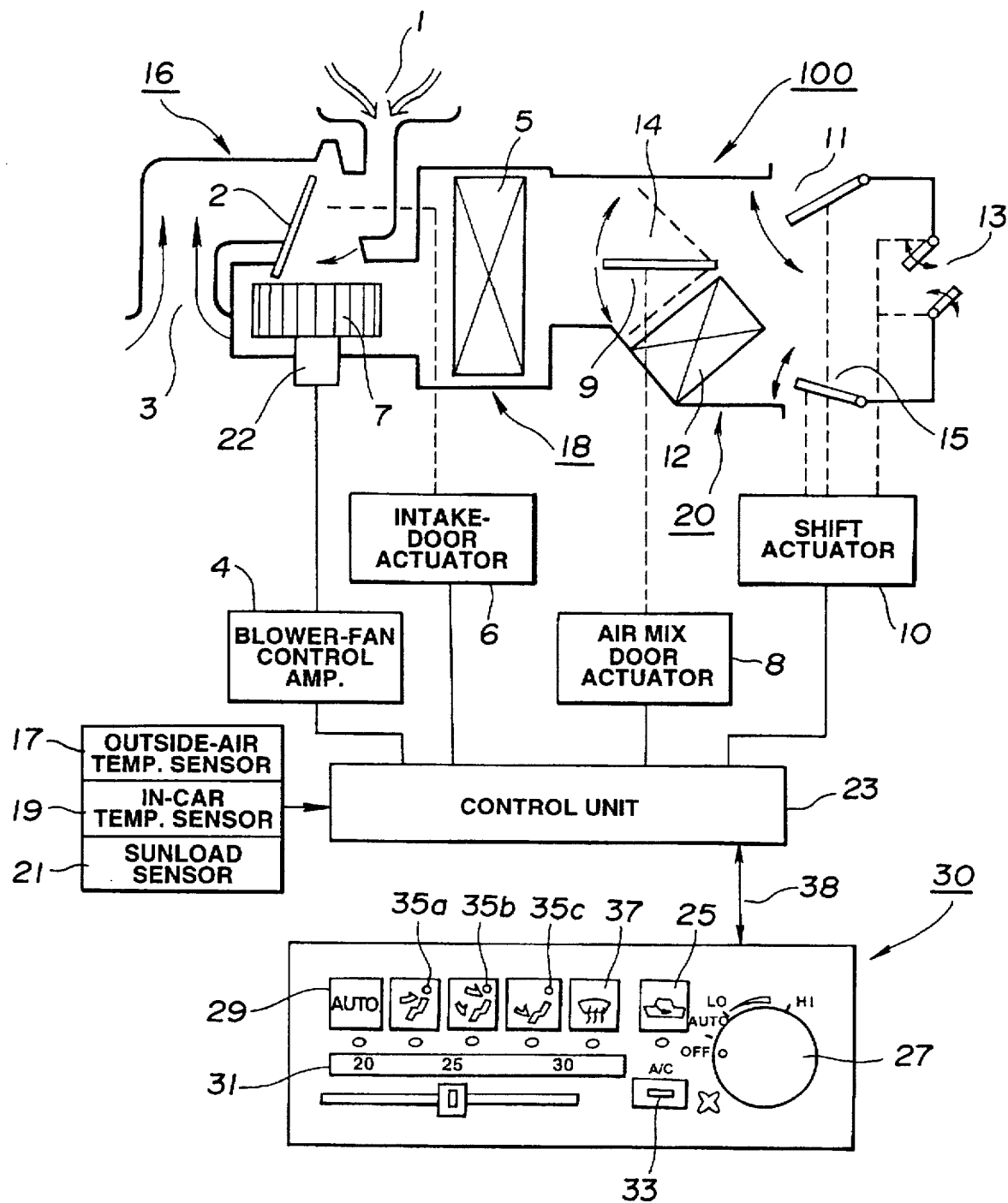
FIG. 1 is a system diagram illustrating one embodiment of an electronic climate control system for an automotive vehicle, made according to the invention.

Referring now to the drawings, particularly to FIG. 1, the electronic climate control system for a car air conditioner 100 includes an air intake unit (or an air inlet assembly) 16 for introducing inside air (recirculating air) and/or outside air (fresh air), a cooling unit 18 for cooling the air through the air intake unit and a heater unit 20 for heating the air leaving an evaporator core of the cooling unit. The air intake unit 16 includes a first air intake 1 and a second air intake 3 respectively for introducing outside air (ambient air) and inside air (recirculating air). In a conventional manner, a recirculate/outside air intake door (or an air inlet recirculation door) 2 is provided at a confluent point between the first and second air intakes 1 and 3, for selectively opening and closing the two air intakes 1 and 3 and thus switching from a recirculating-air mode (simply "REC mode") to a fresh-air mode (simply "FRE mode") or vice versa depending on the angular position of the intake door 2. A blower fan 7 is provided in the vicinity of the intake door 2. The fan 7 is driven by means of a blower motor 22. The cooling unit is a conventional compression/refrigerating cycle type and includes an evaporator 5 which is provided for cooling the air directed to the evaporator inlet by way of the blower fan 7 and for removing moisture from the air. Although it is not shown in the drawings, the cooling unit includes an air-conditioning compressor which is driven usually by the engine mounted on the vehicle. Refrigerant circulates within the cooling system and the liquid refrigerant evaporates and cools the air by absorbing the heat from the air flowing through the evaporator core. The heater unit 20 includes a heater core 12 within which hot engine coolant circulates for heating the air cooled by the evaporator. The heater core assembly is cooperative with the inner wall of the heater-unit duct to define a cooler air passage 14. An air mix door 9 is hingedly connected to the corner frame of the heater core 12 for adjusting the flow rate of the cooler air flowing therethrough and for controlling the blend of evaporator core and heater core air. The conditioned air is discharged into the passenger compartment through a plurality of discharged-air ducts or vents, namely instrument panel/dash discharged-air ducts or vents including center ventilator ducts and side ventilator nozzles, defrost outlets directed to the windshield, and floor outlets or foot vents. As seen in FIG. 1, a defrost door 13 is provided upstream of the defrost outlets for controlling the flow rate of discharged air from the defrost outlets, a vent door 11 is provided upstream of the air conditioning ventilator ducts or nozzles for controlling the flow rate of discharged air from the center/side vents, and a foot door 15 is provided upstream of the foot vents for controlling the flow rate of discharged air from the foot vents. Mounted on the instrument panel is a climate control panel 30 with a so-called AUTO switch 29 for transition between the automatic air-conditioning mode (the auto mode) and the manual control mode (the manual mode), a fan speed control button (or a fan switch) 27 for selecting one of a plurality of blower fan speed modes, a recirculate/outside air mode switch (simply "REC switch") 25 for selecting one of the recirculation-air mode and the fresh-air mode, a temperature control mode lever 31 for setting a desired, driver-selected in-car temperature, a series of mode switches 35a, 35b and 35c for selecting one of a plurality of discharge modes namely VENT mode, BI-LEVEL mode and FOOT mode, an air conditioner switch 33 (simply "A/C switch") for activating the air-conditioning compressor clutch and thus producing the compressor-on state, and a defogger mode switch 37 (simply "DEFOG switch"). Ordinarily, when the car air conditioner is turned on in the DEF mode, almost all of discharge air is directed to the defrost outlets with the compressor turned ON, with the air mix door 9 held at its FULL-HOT and with the intake door 2 held at the FRE mode position, for the purpose of efficiently removing moisture on the windshield. The control panel 30 is intercommunicated with an electronic climate control unit 23 via a communications line 38, for information transmission or signal transmission between the control panel 30 and the control unit 23. The input interface of the climate control unit 23 receives signals from a variety of sensors, namely an outside air (ambient) temperature sensor 17, an in-car temperature sensor 19, and a sunload sensor 21, whereas the output interface of the control unit 23 is connected to a fan control amplifier (or a fan control circuit) 4 for controlling a blower fan speed, an intake-door actuator 6 for adjusting the opening of the intake door 2, an air mix door actuator 8 for adjusting the opening of the air mix door 9, and a shift actuator 10 for opening/closing motion of the plural ventilator doors such as the defrost door 13, the ventdoor 11 and the foot door 15. The climate control unit 23 is responsive to various sensor signals from the sensors 17, 19 and 21 as well as switch signals from control panel switches 25, 27, 29, 33, 35a to 35c, and 37 and a driver-selected in-car temperature signal whose signal value is determined by the position of the sliding contact of the temperature control mode lever 31, for controlling various parameters, for example the blower fan speed, the intake-door opening (the set angular position of the intake door), the air-mix-door opening, and the discharge-air outlet mode (the openings of plural discharged-air ducts or vents 11, 13 and 15. As set forth above, the climate control unit 23 and the climate control panel 30 are intercommunicated by means of the communications line 38. In more detail, the communications line 38 serves to perform display-data communication (or display-command signal transmission) from the control unit 23 to the control panel 30 for displaying the computed data signals of the control unit on the vehicle instrument panel and also to perform data transmission from the control panel 30 to the control unit 23 in such a manner that the control unit monitors driver's requirements based on various switch signals from the control panel switches and the set in-car temperature based on the position of the temperature selector lever 31. Hereinafter described in detail a fail-safe function performed by the system of the embodiment in the event that the vehicle experiences the communication failure between the control panel 30 and the control unit 23. In the shown embodiment, the fail-safe function of the system is executed to prevent any moist air as breath humidity from the driver and passengers from clouding the windshield and to avoid development of condensation or freezing of moisture on the windshield, when the fresh-air mode is not selected in spite of the fact that the REC switch 25 is depressed for selection of the fresh-air mode and when the defogger mode is not selected in spite of the fact that the DEFOG switch 37 is depressed for selection of the defogger mode, owing to the communication failure between the control panel 30 and the control unit 23.

Figure 2:
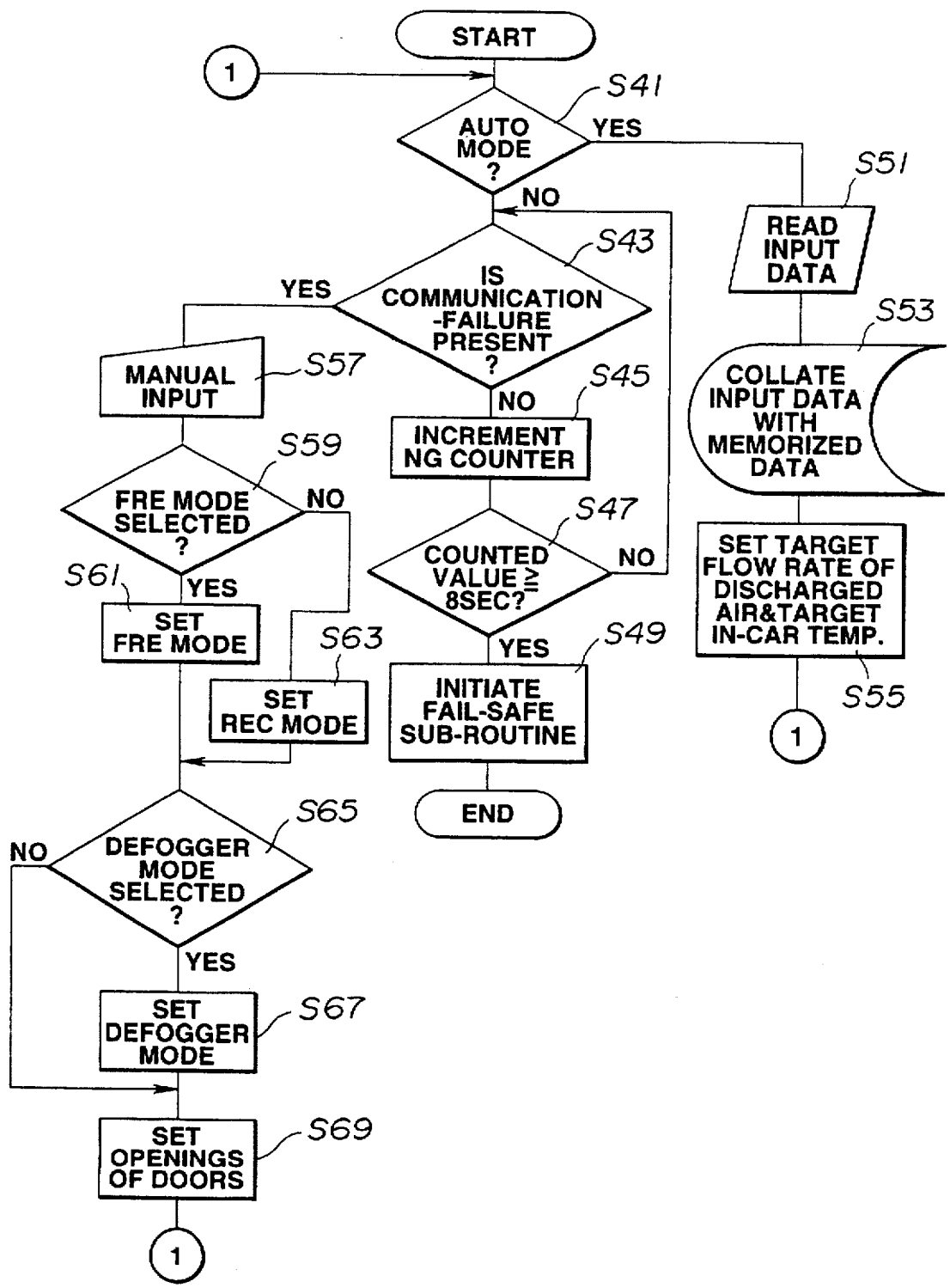
FIG. 2 is a flow chart illustrating a fail-safe function of the system of the invention.

Referring now to FIG. 2, there is shown the fundamental controlling routine which is provided to initiate the fail-safe subroutine, as will be discussed later. The controlling routine of FIG. 2 begins from the time when the car air conditioner 100 has been switched on. Within the vehicle compartment, first of all, either an auto mode (an automatic air-conditioning mode) or a manual mode is selected by the vehicle occupant (the driver/passenger) by depressing the AUTO switch 29. As soon as the controlling routine of FIG. 2 starts, in step S41 a test is made to determine whether or not the auto mode is selected. When the answer to step S41 is affirmative (YES), i.e., in case that the auto mode is selected, step S51 proceeds. In step S51, read is the input information namely signal values from the sensors 17, 19 and 21. In steps 53 and S55, these input signals representative of in-car temperature, ambient temperature and heat load are compared or collated with data stored in the memory of the control unit in the form of a data map or a look-up table, and thereafter a target flow rate of discharged air and a target temperature of discharged air (a target in-car temperature) are retrieved from the look-up table.

In contrast to the above, when the answer to step S41 is negative (NO), i.e., in case that the manual mode is selected, step S43 proceeds in which a test is made to determine whether normal communication between the control panel 30 and the control unit 23 is present or communication-failure between the control panel 30 and the control unit 23 occurs. The communication failure means a failure in mutual communication between the control panel and the control unit, and specifically means a failure in data transmission from the control panel to the control unit. When the answer to step S43 is affirmative, i.e., if step S43 decides that the normal communication is present, then step S57 enters in which manual input is made by the vehicle occupant (the driver/passenger) through the control panel switches/lever, such as by sliding the temperature control lever 31 for the in-car temperature setting, by depressing either one of the mode switches 35a, 35b or 35c for the discharged-air outlet setting (or the discharge mode setting), by depressing the DEFOG switch 37 for the defogger mode setting and/or pushing the fan control speed button 27 for the fan speed setting. Thereafter, in step S59, a test is made to determine whether the REC switch is turned on in the REC mode or in the FRE mode. Depending on the selected air inlet mode, the procedure flows from step S59 to either one of steps S61 and S63. That is, when the REC mode is selected, the system is turned on in the recirculating-air mode in step S61. Conversely, when the FRE mode is selected, the system is turned on in the fresh-air mode in step S63. Thereafter, in step S65 a test is made to determine whether or not the defogger mode is selected (i.e., the DEFOG switch is turned on). If the defogging mode (or the anti-clouding mode) is selected by the DEFOG switch 37, step S67 proceeds to turn on the system in the defogger mode, and then step S69 proceeds. Conversely, if the defogger mode is not selected, the procedure flows from step S65 to step S69. In step S69, set are openings (angular positions) of doors associated with the respective actuators 6, 8 and 10 and/or a fan speed (or a rotational speed) of the blower-fan motor 22 connected to the fan control amplifier 4, as selected by a series of manual-mode flow from step S57 through steps S59, S61, S63, S65 and S67. As may be appreciated from the flow from step S41 through steps S43, S57, S59, S61 (or S63), and S65 (or via S67) to S69, the manual-mode flow is repeatedly executed until the system's operating mode is shifted to the auto mode.

In contrast with the above, if step S43 decides that the communication-failure is present at the communications line 38 and thus switch signals from the control panel 30 cannot be received by the control unit 23, step S45 proceeds in which a NG counter or NG timer is incremented from zero so as to count an elapsed time from the time when the communication-failure state has been detected initially. Thereafter, in step S47, the counted value of the NG counter is compared to a predetermined period of time such as 8 sec, so as to determine whether or not the communication-failure state has continued for the predetermined period. In case of (the counted value) <8 sec, the procedure flows from step S47 to step S43. The predetermined period of time (8 sec) means a time period necessary to precisely decide the presence or absence of the communication-failure. Thus, the predetermined time period will be hereinafter referred to as a "communication-failure decision time period". In case that the counted value of the NG counter exceeds the communication-failure decision time period (8 sec), the fail-safe sub-routine is initiated at step S49. For example, owing to loose connections of the communications line 38 to respective signal connectors of the control panel 30 and the control unit 23 and vibrations transmitted to the vehicle, the communications line 38 is reconnected to the respective signal connectors for a short time interval, the procedure may flow from step S43 to step S57 before the counted value of the NG counter reaches the communication-failure decision time period. In such a case, instead of the fail-safe sub-routine (step S49), the normal manual-mode settings are made in accordance with the flow from step S57 to step S69. Hereinafter described in detail are first and second fail-safe sub-routines.

Figure 3:
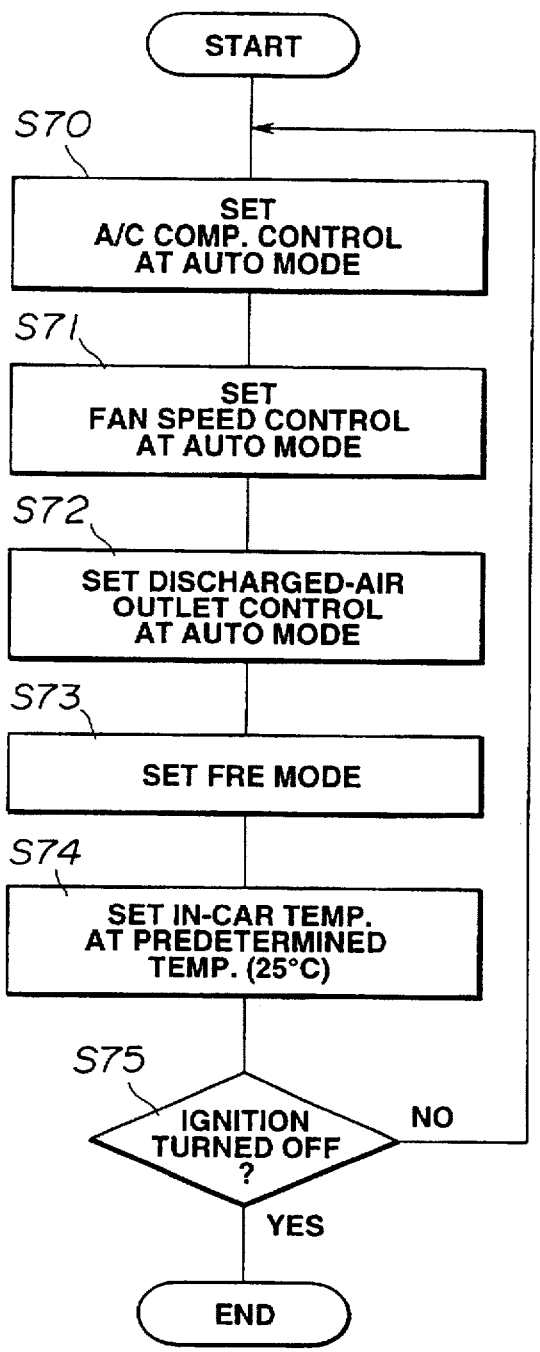
FIG. 3 is a flow chart illustrating one fail-safe sub-routine of the system of the invention.

Referring now to FIG. 3, there is shown the first fail-safe sub-routine according to which the system's operating mode is automatically shifted from the manual mode to the auto mode and the fresh-air mode is selected to permit fresh air (outside air) to be introduced into the passenger compartment, in the presence of the previously-noted communication failure.

As seen in FIG. 3, according to the first fail-safe sub-routine, first of all, the air-conditioning compressor control, the blower fan speed control, and the discharged-air outlet control are all executed in accordance with the auto mode (see steps S70, S71 and S72). That is, as soon as the routine of FIG. 2 determines the presence of the communication failure, the system's operating mode is automatically shifted to the auto mode according to the sub-routine of FIG. 3. Thereafter, in step S73, the fresh-air mode (FRE mode) is automatically set to introduce fresh air into the vehicle passenger compartment, thus removing moisture from the inside air and preventing any moist air from fogging the windshield. In step S74, the in-car temperature is set at a predetermined temperature value such as 25° C. at which the vehicle occupants may ordinarily feel comfort. The previously-noted procedures (steps S70 to S74) are repeatedly executed until the ignition switch is turned OFF (see step S75). As set out above, in case of the first fail-safe sub-routine shown in FIG. 3, when the control unit finally determines the presence of the communication-failure through steps S43, S45 and S47 (see FIG. 2), the system's operating mode is quickly shifted to the auto mode and additionally the air inlet mode is quickly shifted to the fresh-air mode, and whereby the system can automatically avoid condensation or freezing of moisture on the windshield. Furthermore, in the event that data transmission is not made from the control panel to the control unit accidentally when the car air conditioner is in the manual mode and the vehicle occupants do not become aware of the presence of the communication failure between the control panel and the control unit, the in-car temperature can be automatically set at the predetermined temperature value such as 25° C. and thus prevents the vehicle occupants from feeling discomfort.

Figure 4:
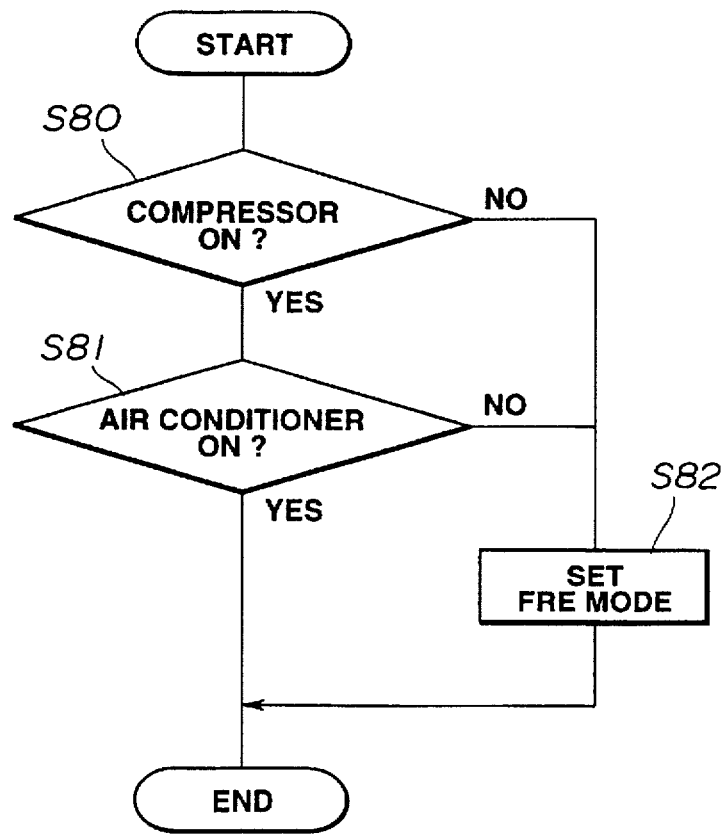
FIG. 4 is a flow chart illustrating another fail-safe sub-routine of the system of the invention.

Referring to FIG. 4, there is shown the second fail-safe sub-routine according to which the air inlet mode is automatically shifted to the fresh-air mode (FRE mode) if the air-conditioning compressor is held in the compressor-off state or the car air conditioner 100 is switched off, in the presence of the previously-noted communication failure. Firstly, in step S80 a test is made to determine whether or not the air-conditioning compressor is in the compressor-on state. If the compressor is turned on, step S81 enters in which a test is made to determine whether the car air conditioner is switched on. When the answer to step S81 is affirmative, i.e., in case that the compressor and the air conditioner are both activated, the second fail-safe sub-routine terminates or ends, because there is less possibility of clouding of the windshield during activation of both the compressor and the air conditioner. In contrast with the above, as may be appreciated from the flow from either steps S80 or S81 to step S82, when either the compressor or the air conditioner is stopped, the procedure flows to step S82 in which the fresh-air mode (FRE mode) is set to prevent any moist air from clouding the windshield.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electronic climate control system for a car air conditioner comprising:

sensor means for detecting environmental conditions including at least an ambient temperature, an in-car temperature and a heat load radiating into a vehicle passenger compartment;

control means being responsive to signals from said sensor means for adjusting an in-car temperature condition towards a desired in-car temperature;

manual input means for manually setting a system's operating mode;

communication means for intercommunicating said control means with said manual input means;

communication-line detection means for determining whether a mutual-communication between said control means and said manual input means is made normally; and defogger means for automatically determining said system's operating mode necessary to prevent a windshield from being fogged when said communication-line detection means determines that a failure in mutual communication is present.

2. An electronic climate control system as set forth in claim 1, wherein said defogger means comprises means for automatically shifting said system's operating mode to an automatic air-conditioning mode and for simultaneously setting an air inlet mode at a fresh-air mode, when said communication-line detection means determines that said failure in mutual communication is present.

3. An electronic climate control system as set forth in claim 1, wherein said defogger means comprises operating-state decision means for determining whether an air-conditioning compressor is in an on state and for determining whether the car air conditioner is in an on state, and means for automatically setting an air inlet mode at a fresh-air mode, when said communication-line detection means determines that said failure in mutual communication is present and said operating-state decision means determines that one of the air-conditioning compressor and the car air conditioner is in an off state.

4. An electronic climate control system for a car air conditioner comprising:

sensors for detecting environmental conditions including at least an ambient temperature, an in-car temperature and a heat load radiating into a vehicle passenger compartment;

a climate control unit being responsive to signals from said sensors for adjusting an interior environment within the vehicle passenger compartment towards desired in-car temperature and humidity conditions;

a manual-input panel for manually setting a system's operating mode;

a communications line for intercommunicating said climate control unit with said manual-input panel;

communication-line detection means for determining whether a failure in data transmission from said manual-input panel to said climate control unit is present, said communication-line detection means determining that said failure in data transmission is present when said failure in data transmission continues for a predetermined period of time from an initial detection time of said failure in data transmission; and fail-safe means for automatically determining said system's operating mode necessary to prevent a windshield from being fogged when said communication-line detection means determines that said failure in data transmission is present.

5. An electronic climate control system as set forth in claim 4, wherein said fail-safe means comprises means for automatically shifting said system's operating mode to an automatic air-conditioning mode and for simultaneously setting an air inlet mode at a fresh-air mode, when said communication-line detection means determines that said failure in data transmission is present.

6. An electronic climate control system as set forth in claim 5, wherein said fail-safe means comprises means for fixing an in-car temperature setting to a predetermined temperature value, when said communication-line detection means determines that said failure in data transmission is present.

7. An electronic climate control system as set forth in claim 4, wherein said fail-safe means comprises operating-state decision means for determining whether an air-conditioning compressor is in an on state and for determining whether the car air conditioner is in an on state, and means for automatically setting an air inlet mode at a fresh-air mode, when said communication-line detection means determines that said failure in data transmission is present and said operating-state decision means determines that one of the air-conditioning compressor and the car air conditioner is in an off state.

* * * * *